(12) United States Patent
Villamizar et al.

(10) Patent No.: US 8,976,163 B2
(45) Date of Patent: Mar. 10, 2015

(54) USING CLOCK DETECT CIRCUITRY TO REDUCE PANEL TURN-ON TIME

(75) Inventors: Daniel A. Villamizar, Cupertino, CA (US); Ahmad Al-Dahle, Santa Clara, CA (US); Shafiq M. Jamal, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 13/491,430

(22) Filed: Jun. 7, 2012

(65) Prior Publication Data
US 2013/0328844 A1    Dec. 12, 2013

(51) Int. Cl.
*G06F 3/038* (2013.01)
*G09G 5/00* (2006.01)
(52) U.S. Cl.
USPC .......................................................... 345/211
(58) Field of Classification Search
None
See application file for complete search history.

(56) References Cited

U.S. PATENT DOCUMENTS

| 5,901,101 | A | 5/1999 | Suzuki et al. | |
| 6,559,824 | B1 * | 5/2003 | Kubota et al. | 345/100 |
| 6,765,954 | B1 | 7/2004 | Eichrodt et al. | |
| 6,937,680 | B2 | 8/2005 | Fong et al. | |
| 7,321,978 | B2 | 1/2008 | Brodsky | |
| 2008/0084410 | A1 * | 4/2008 | Uehara | 345/211 |

* cited by examiner

*Primary Examiner* — Nicholas Lee
(74) *Attorney, Agent, or Firm* — Fletcher Yoder PC

(57) ABSTRACT

Systems, devices, and methods for using clock detector circuitry to reduce turn-on time of an electronic display, improve image quality, and reduce operations of a host are provided. In one example, a system may include a host configured to transmit a number of signals and a display driver coupled to the host. The number of signals may include a clock signal and data signals. The display driver is configured to drive a display based at least in part on the data signals. The display driver is also configured to be reset upon detection of the clock signal without waiting for a host-issued reset signal. A clock detect circuit configured to detect the clock signal may be configured to transmit an internal reset signal to reset the display driver without a dedicated host-issued reset signal.

21 Claims, 9 Drawing Sheets

USING CLOCK DETECT CIRCUITRY TO REDUCE PANEL TURN-ON TIME

BACKGROUND

The present disclosure relates generally to electronic displays, and more particularly to display drivers that use clock detect circuitry to reduce turn-on time of an electronic display and to reduce operations of a host.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays, such as liquid crystal displays (LCDs) and organic light-emitting diode (OLED) displays, are commonly used in electronic devices such as televisions, computers, and phones. LCDs portray images by modulating the amount of light that passes through a liquid crystal layer within pixels of varying color. OLED displays portray images by modulating light produced by pixels of varying color. A display driver for an LCDs and OLED produces images on the display by adjusting the image signal supplied to each pixel across the display.

Display drivers may change the image signals supplied to each pixel based on input supplied to the display driver as data signals. When the display is powered down, the display driver may stop supplying image signals to each pixel. The display driver may be in an unknown state when the display is powered down. Conventionally, when the display is turned on, the display driver may receive a clock signal followed by an external reset signal from a host to put the display driver in a ready state to drive the display. Each signal may be received by the display driver along a designated input pin. The time between the clock signal and the external reset signal may vary, delaying the production of images on the display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, devices, and methods for using clock detect circuitry to reduce turn-on time of an electronic display, to improve image quality, and to reduce operations of a host. By way of example, a system may include a host configured to transmit a number of signals and a display driver coupled to the host. The number of signals may include a clock signal and data signals. The display driver is configured to drive a display based at least in part on the data signals. The display driver is also configured to be reset upon detection of the clock signal without waiting for a host-issued reset signal. In some embodiments, the display driver includes a state machine configured to receive the clock signal from the host and a clock detect circuit configured to detect the clock signal. The clock detect circuit may be configured to transmit an internal reset signal to the state machine to reset the display driver without a dedicated host-issued reset signal.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 is a timing diagram illustrating the timing of signals received and transmitted by an embodiment of the display driver of FIG. 4 when the display is turned on;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, embodiments of the present disclosure relate to display drivers that use clock detect circuitry to reduce turn-on time of an electronic display, to improve image quality, and to reduce operations of a host. Rather than resetting a display driver in a conventional manner when an electronic display is turned on by supplying an external reset signal to the display driver in addition to a clock signal and data signals, embodiments of the present disclosure may incorporate circuitry within the display driver for resetting a display driver based upon detection of the clock signal from the host.

Figure 1:
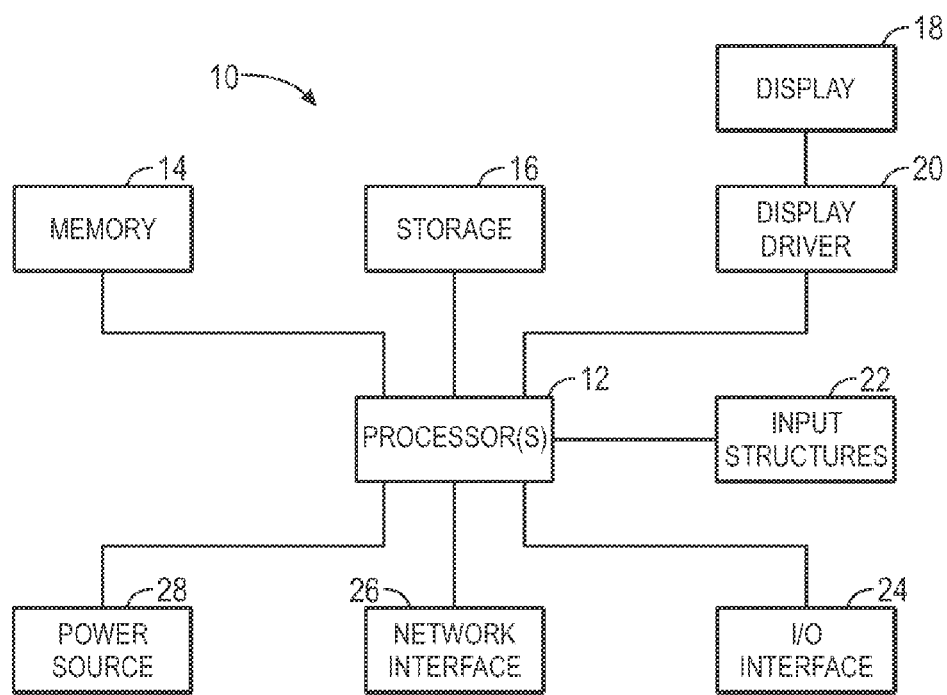
FIG. 1 is a schematic block diagram of an electronic device with a display driver having a clock detect circuit to reduce turn-on time of the display, in accordance with an embodiment.
Figure 2:
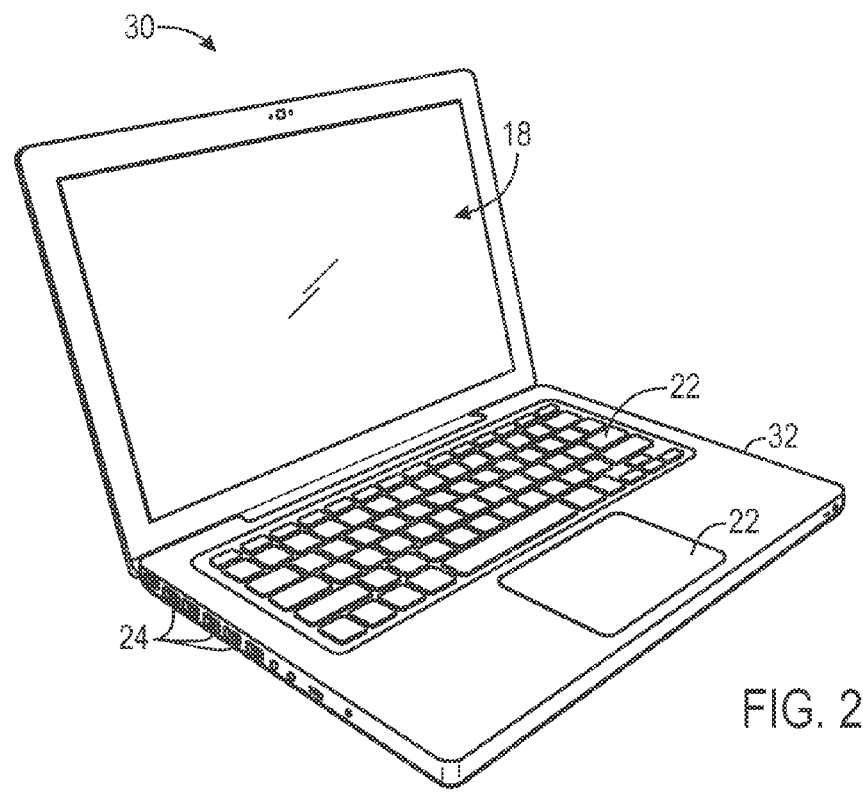
FIG. 2 is a perspective view of a notebook computer representing an embodiment of the electronic device of FIG. 1.
Figure 3:
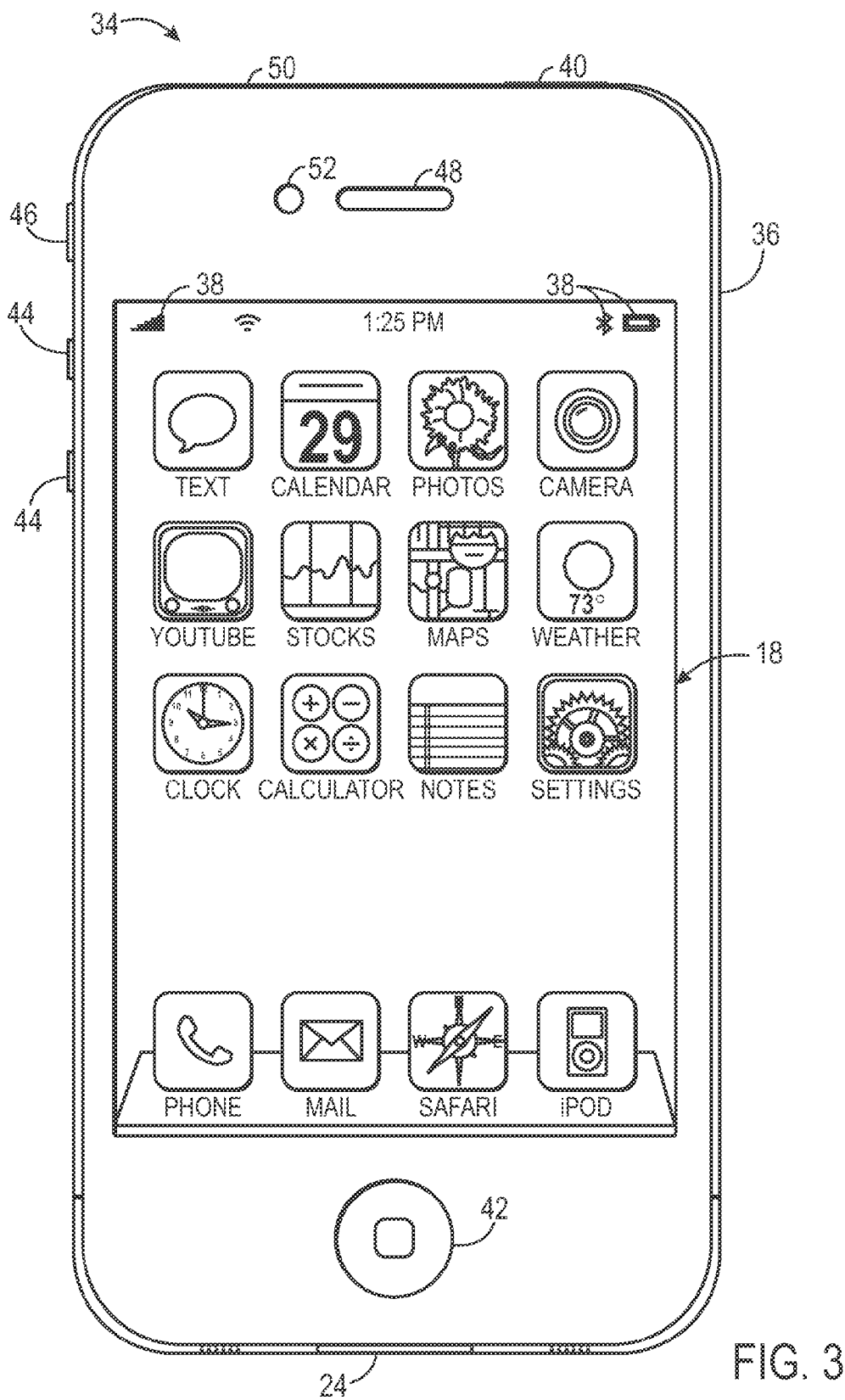
FIG. 3 is a front view of a handheld device representing another embodiment of the electronic device of FIG. 1.

With the foregoing in mind, a general description of suitable electronic devices that may employ electronic displays having display drivers with reduced turn-on time using a clock detect circuit will be provided below. In particular, FIG. 1 is a block diagram depicting various components that may be present in an electronic device suitable for use with such a display and display driver. FIGS. 2 and 3 respectively illustrate perspective and front views of a suitable electronic device, which may be, as illustrated, a notebook computer or a handheld electronic device.

Turning first to FIG. 1, an electronic device 10 according to an embodiment of the present disclosure may include, among other things, one or more host(s) or processor(s) 12, memory 14, nonvolatile storage 16, a display 18 having a display driver 20 for driving the display 18 when the display 18 is turned on, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10.

By way of example, the electronic device 10 may represent a block diagram of the notebook computer depicted in FIG. 2, the handheld device depicted in FIG. 3, or similar devices. It should be noted that the host (s) 12 and/or other data processing circuitry may be generally referred to herein as "data processing circuitry" or "host." This host may be embodied wholly or in part as software, firmware, hardware, or any combination thereof. Furthermore, the host may be a single contained processing module or may be incorporated wholly or partially within any of the other elements within the electronic device 10. As presented herein, the host may control the electronic display 18 by determining when the electronic display 18 is to be turned on or powered down and what is to be displayed by issuing a clock signal and data signals to the display driver 20 without issuing a reset signal. Upon receiving the clock signal, the display driver 20 resets and drives the display 18 in a way that reduces the turn-on time of the display 18, improves image quality, or reduces the operations of the host 12, or combinations thereof.

In the electronic device 10 of FIG. 1, the host(s) 12 and/or other data processing circuitry may be operably coupled with the memory 14 and the nonvolatile memory 16 to execute instructions. Such programs or instructions executed by the host(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the host(s) 12.

The display 18 may be a touch-screen liquid crystal display (LCD) or an OLED display, for example, which may enable users to interact with a user interface of the electronic device 10. In some embodiments, the electronic display 18 may be a MultiTouch™ display that can detect multiple touches at once. As will be described further below, the display driver 20 may include clock detect circuitry that can detect the clock signal and transmit an internal reset signal within the display driver 20 to reset the display 18 without a dedicated host-issued (i.e., external) reset signal. This display driver 20 may eliminate a dedicated connection (e.g., reset pin) between the host and display driver 20 to reduce the number of connections or free the connection for another use by the host 12.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In one embodiment, the input structures 22 (such as a keyboard and/or touchpad) may be used to interact with the computer 30, such as to start, control, or operate a GUI or applications running on computer 30. For example, a keyboard and/or touchpad may allow a user to navigate a user interface or application interface displayed on the display 18. Further, the display 18 may include the display driver 20 configured to be reset upon detection of the clock signal without waiting for a host-issued (i.e., external) reset signal.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate a user interface to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. As mentioned above, the display 18 may include the display driver 20 configured to be reset upon detection of the clock signal without waiting for a host-issued (i.e., external) reset signal.

Figure 4:
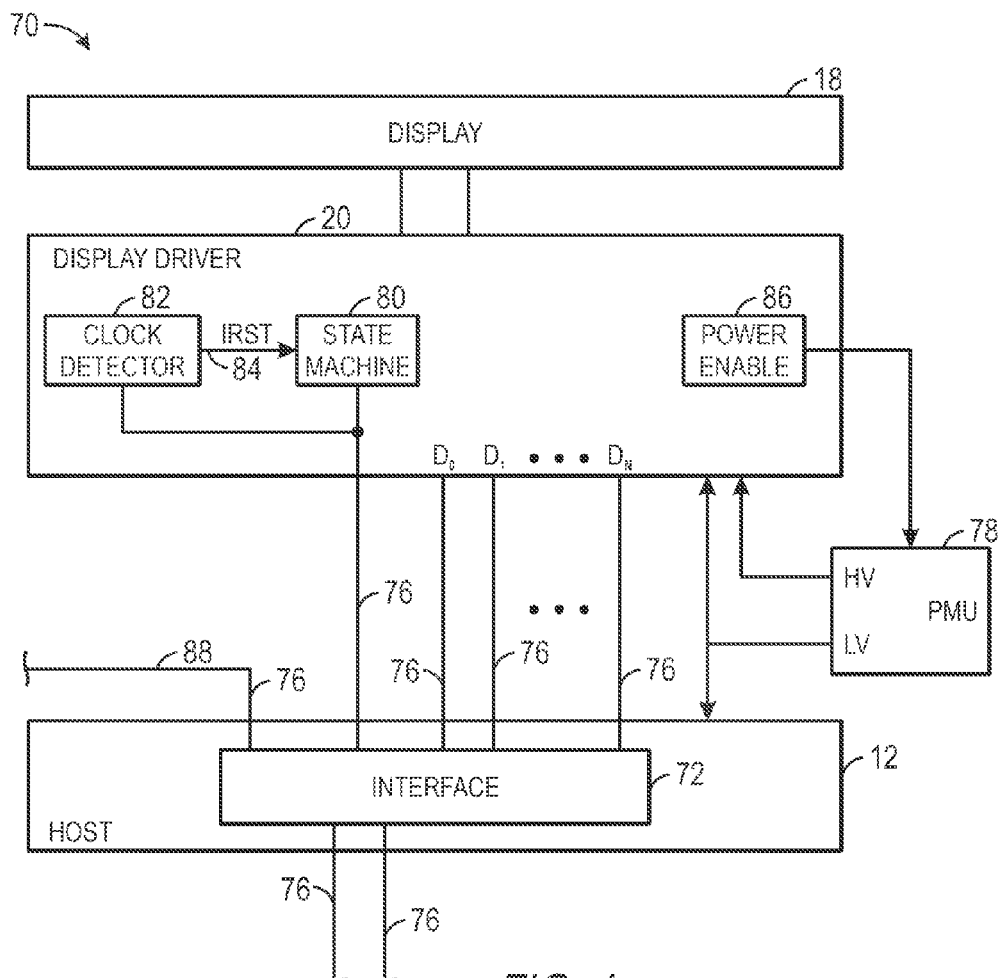
FIG. 4 is a block diagram illustrating a display driver having a clock detect circuit to supply an internal reset signal to reset the display driver upon detection of a clock signal, in accordance with an embodiment.

Among the various components of an electronic device 10 may be a first display processing circuit 70 as shown in FIG. 4. FIG. 4 generally represents a block diagram of certain components of the first display processing circuit 70 in accordance with an embodiment. The host 12 may be configured supply signals to the display driver 20 so that the display driver 20 may drive the display 18 to produce images based on the supplied signals. For example, the host 12 may process code or instructions to display images on the display 18. The host 12 may supply data signals (e.g., $D_0, D_1 \ldots D_N$) to the display driver 20 as data packets of information from an interface 72, such as a Mobile Industry Processor Interface (MIPI). In some embodiments, the host 12 may include more than one interface 72. The host 12 is configured to supply a number of signals (e.g., clock signal (CLK), data signals) through the interface 72 along a number of connections 74. In some embodiments, the clock signal may be supplied by an interface 72 separate from the data signals. In some embodiments, the interface 72 may also receive and supply signals along the number of connections 74 with other components of the electronic device 10 as discussed above with FIG. 1. The display driver 20 processes the data signals and drives a number of pixels of one or more colors arrayed across the display 18 to produce images. The display driver 20 may be configured to drive the number of pixels by adjusting the voltage and/or current supplied to each pixel to adjust the color and/or brightness of each pixel to produce the images according to the supplied data signals from the host 12.

A power management unit (PMU) 78 may be coupled to the host 12 and display driver 20 to supply low voltage for processing signals. The host 12 may be configured to transmit a clock signal (CLK) to the display driver 20. As may be appreciated, the clock signal CLK may be configured to synchronize the display driver 20 with the host 12 to improve the communication between the host 12 and the display driver 20 through the interface 72 and to improve the image quality of the display 18. Handshakes to synchronize the host 12 and the display driver 20 may include at least three operations: a host-issued clock signal, a host-issued reset signal, and a display-driver-issued acknowledgement signal. The example of FIG. 4, however, may eliminate the host-issued reset signal, thus reducing the operations of the handshake to synchronize the host 12 and the display driver 20. Some embodiments discussed below with FIGS. 8-13 may also eliminate the display driver-initiated acknowledgement signal, further reducing the operations of the handshake.

In some embodiments, a state machine 80 may receive the clock signal CLK and direct the operation of the display driver 20 based on the operating state of the state machine 80. The display driver 20 may use the clock signal CLK to orderly process the data signals received from the host 12 at regular intervals based on the cycle of the clock signal CLK. The display driver 20 may be configured to process data signals after first receiving the clock signal CLK; that is, the display driver 20 may be in an idle state awaiting the clock signal CLK before processing any received data signals. In some embodiments, the host 12 may be configured to supply the clock signal CLK to the display driver 20 prior to or while supplying data signals to the display driver 20.

The display driver 20 may be configured to process signals (e.g., data signals) received from the host 12 based at least in part on the operating state of the state machine 80 within the display driver 20. The display driver 20 may be reset to a known operating state so that the display driver 20 may properly process the data signals into image signals to drive the display 18 to produce desired images. Prior to being reset, the display driver 20 may not be in the proper state (e.g., active state) to process the received data signals into image signals to produce desired images. In some embodiments, the display driver 20 may be configured to process data signals into image signals only when in the proper state. Data signals received when the display driver 20 is in a different state may be stored for later processing and display or discarded. Some examples of operating states of the display driver 20 include, but are not limited to an unpowered state, an idle state, a ready state, an active state, or any other state.

The state machine 80 may be configured to reset the display driver 20 upon receipt of a reset signal. In the example of FIG. 4, a clock detect circuit 82 within the display driver 20 is configured to detect the clock signal CLK and transmit an internal reset signal (IRST) 84 to the state machine 80. Thus, the clock detect circuit 82 may reset the display driver 20 without an external reset signal, such as an external reset signal from the host 12 or another component of the electronic device 10. The clock detect circuit 82 may include any suitable clock detection circuit to generate the internal reset signal IRST 84. The internal reset signal IRST may reset the display driver 20 to a ready state configured to process data signals to control the display 18.

The display 18 may require a higher voltage to operate than the host 12 and/or display driver 20. The PMU 78 may be configured to supply a high voltage (HV) signal to the display driver 20 to drive the display 18 to produce images. In some embodiments, the low voltage signal may be sufficient only for processing of the data signals with digital circuitry within the display driver, whereas the high voltage signal HV is sufficient for powering the analog circuitry of the display 18. The PMU 78 may supply the high voltage signal HV on demand upon receiving a power enable signal from a power enable circuit 86 within the display driver 20. In some embodiments, the reset display driver 20 may be configured to supply the power enable signal from the power enable circuit 86 after receiving a certain set of data signals, such as a power packet from the host 12. The power packet may be received as one or more data signals from the interface 72. By controlling the power packet, the host 12 in this embodiment may be configured to control the timing and supply of the high voltage signal HV supplied to the display driver 20 by the PMU 78.

The data driver 20 supplied with the high voltage signal HV may be in a state (e.g., active state) configured to process data signals into image signals to drive the display 18. The display driver 20 may receive data signals as data packets. Each data packet may include code or instructions for images to be displayed on the display 18. The display driver 20 in the active state is configured to process the data packets to image signals to drive each pixel across the display 18. The image signals are applied voltages configured to affect the color and brightness of each pixel. The display driver 20 may produce one or more images on the display 18 based on the received data signals by controlling the color and brightness of each pixel across the display 18. The turn-on time of the display 18 may be the time from when the clock signal CLK is supplied by the host 12 to when the display driver 20 produces images on the display 18.

Figure 5:
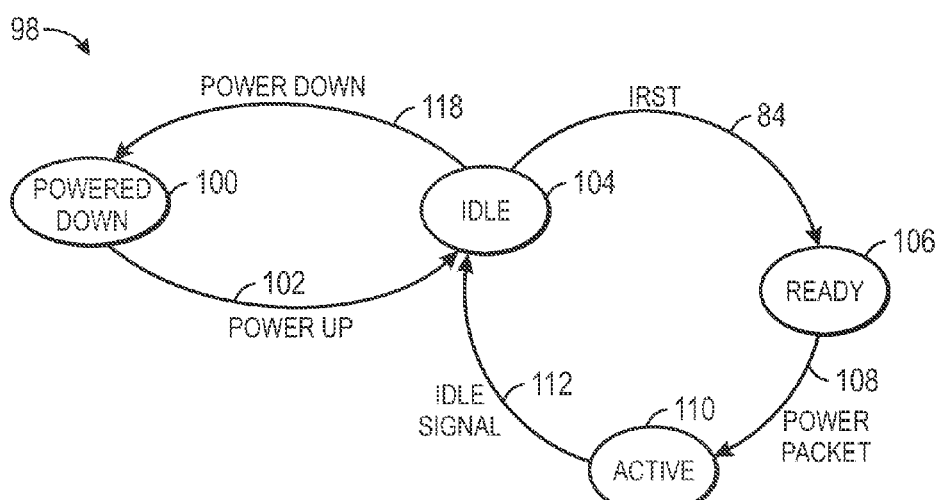
FIG. 5 is a state diagram illustrating the operating states of an embodiment of the display driver of FIG. 4.

The display driver 20 may be in a variety of states during operation, such as a ready state and an active state. The display driver 20 may receive a number of signals during operation, and the state machine 80 may be configured to control how the display driver 20 processes the received number of signals. The first state diagram 98 of FIG. 5 generally illustrates some of the operating states of the display driver 20 having the clock detect circuit 82 to supply the internal reset signal IRST 84 to the state machine 80 of FIG. 4. In a powered down state 100, the display driver 20 of an electronic device 10 is de-energized, or powered down, so that the display driver 20 does not receive any signals from the host 12, display 18, or PMU 78. In some embodiments, a user input structure 22 may be configured to power up 102 the display driver 20 to an idle state 104. The user input structure 22 may toggle the display driver 20 between the powered down state 100 and an idle state 104. In the idle state 104, the PMU 78 supplies the low voltage signal to the display driver 20 to operate digital circuitry, (e.g., the state machine 80). While the display driver 20 is in the idle state 104, the host 12 may be powered on to generate and process a number of signals. In the idle state 104, the display driver 20 is configured to wait for the receipt of the clock signal CLK from the host 12. In some embodiments, the display driver 20 may be configured to store or discard any received signals from the host 12 other than the clock signal CLK. In the idle state 104, the display driver 20 may not process data signals or produce images on the display 18. Examples of an electronic device 10 with the display driver 20 in the idle state 104 may include the notebook computer 30 of FIG. 2 with the cover closed or a powered on handheld device 34 of FIG. 3 where the display driver 20 does not produce images on the display 18, such as while in the pocket of a user.

At any time while the display driver 20 is in the idle state 104, the host 12 may receive a signal to turn on the display 18 through the input structures 22, I/O interface 24, network interface 26, or other components. For example, user activation of an input structure 22 or receipt of a network signal through the network interface 26 may supply a signal to the host 12 to turn on the display 18. Upon receiving the signal, the host 12 is configured to supply the clock signal CLK to the state machine 80 of the display driver 20. The clock detect circuit 82 within the display driver 20 is configured to detect the supplied clock signal CLK and supply the internal reset signal IRST 84 to reset the display driver 20 to the ready state 106. The display driver 20 is reset to the ready state 106 upon detection of the clock signal without waiting for a host-issued reset signal or other external reset signal.

In the ready state 106, the display driver 20 is configured to process at least some of the data signals supplied by the host 12. The display driver 20 in the ready state 106 is configured to wait for the receipt of a power packet 108 from the host 12. The power packet controls the power enable circuit 86 of the display driver 20 to supply a power enable signal to the PMU 78. The PMU 78 supplies a high voltage signal to the display driver 20 to power the display 18. Upon receiving the power packet 108, the display driver 20 shifts to the active state 110. In the active state 110, the display driver 20 is configured to process the supplied data signals into image signals used to drive the display 18. The display 20 is turned on when the display driver 20 is in the active state 110 and producing images on the display 18. From the active state 110, the display driver 20 may be configured to shift to the idle state 104 due to a variety of conditions. For example, the display driver 20 may be configured to shift to the idle state 104, upon receipt of an idle signal 112, such as a power-off packet from the host 12, a set amount of time of producing the same image on the display 18 has elapsed, or the failure of the display driver 20 to receive signals (e.g., clock signal, data signal) from the host 12. In the idle state 104, the display driver 20 may be configured to wait for the receipt of a clock signal from the host 12 to generate the internal reset signal IRST 84 to reset the display driver 20 to the ready state 106. Alternatively, the display driver 20 in the idle state 104 may be configured to wait for the receipt of a power down signal 118 to power down the display driver 20 to the powered down state 100.

The display driver 20 with the internal clock detect circuit 82 may be configured to reduce turn-on time of the display 18 and reduce the operations of the host 12 to operate the display 18. Reducing the turn-on time of the display 18 may reduce user wait time to use the display 18, increase user productivity, or improve the quality of user operation, or combinations thereof. Reducing the operations of the host 12 may enable the host 12 to perform other operations faster, to operate at lower temperatures, or to improve operations of other components coupled to the host 12, or combinations thereof.

Detection of the clock signal CLK by the clock detect circuit 82 may improve the functionality of the first display processing circuit 70. The clock detect circuit 82 may detect the clock signal CLK as soon as soon as it is received by the state machine 80. Upon receiving the clock signal CLK, the clock detect circuit 82 may supply the internal reset signal IRST 84 to the state machine 80 to reset the display driver without waiting for a dedicated host-issued reset signal. By supplying the internal reset signal IRST 84, the clock detect circuit 82 may reduce the connections 76 between the host 12 and the display driver 20. For example, a display driver 20 without the clock detect circuit 82 may be configured to receive an external host-issued reset signal along a reset connection 88 (e.g., I/O pin). By supplying the internal reset signal IRST 84 from the clock detect circuit 82, the reset connection 88 may be configured for another use by the host 12 or eliminated.

The internal reset signal IRST 84 also reduces the time between when the display driver 20 receives the clock signal CLK and when the display driver 20 is reset to a ready state 106 to receive data signals (e.g., power packet). The clock detect circuit 82 may generate the internal reset signal IRST 84 when the clock signal CLK is received, rather than wait for the host 12 to supply any external reset signal. In some embodiments, the clock detect circuit 82 may be configured to supply the internal reset signal IRST 84 immediately upon detecting the clock signal CLK. The clock detect circuit 82 may be configured to supply the internal reset signal IRST 84 within the same detected cycle or within the next cycle of the clock signal CLK. In some embodiments, the state machine 80 receives the internal reset signal IRST 84 within approximately five clock cycles of being supplied by the host 12. In this way, the display driver 20 may be reset to a ready state 106 to process data signals upon detection of the clock signal CLK without waiting for a host-issued reset signal. Furthermore, the host 12 may supply the power packet to the display driver 20 after the clock signal CLK without waiting to supply a host-issued reset signal. In some embodiments, the host 12 may supply the power packet 108 to the display driver 20 repeatedly until the display driver 20 is in the ready state 106 configured to use the power packet 108 to control the PMU 78. This may simplify the operation of the host 12 by eliminating a step to determine whether the display driver 20 has been reset to the ready state 106. In this way, the display driver 20 may be set to an active state 110 to drive the display 18 more quickly by using an internal reset signal IRST 84 than if the display driver 20 is configured to wait for a host-issued reset signal. Reducing the time between receiving the clock signal CLK and setting the display driver 20 to a ready state 106 or an active state 110 may reduce turn-on time of the display 18.

Figure 6:
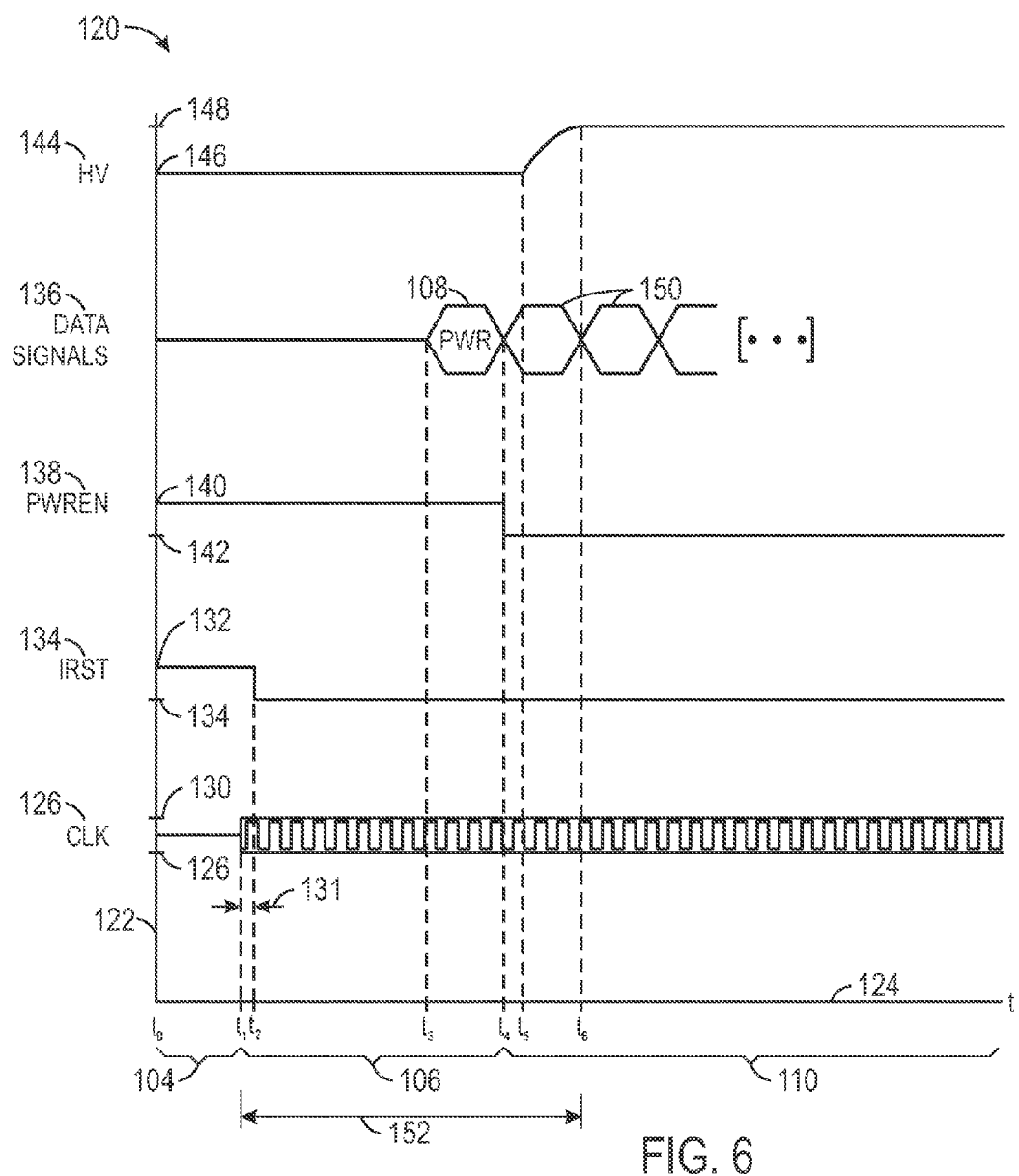

To facilitate the understanding of the display driver 20 having the clock detect circuit configured internally to reset the display driver 20, the graph 120 of FIG. 6 illustrates an embodiment of the relative timing of the various signals discussed above. The Y-axis 122 has a series of signals that may be supplied or received by the display driver at any time during operation, and the X-axis 124 represents the time of operation of the electronic device 10. At $T_0$, the display driver 20 is in the idle state 104 awaiting the receipt of the clock signal CLK 126. Thus, at $T_0$, the display 18 is not being driven by the display driver 20. At $T_1$, the host 12 generates the clock signal CLK 126 that is supplied to the display driver 20. The clock signal CLK 126 may be a periodic signal (e.g., square wave) that alternates between a first voltage 128 and a second voltage 130 at a regular time interval (i.e., cycle).

The clock detect circuit 82 within the display driver 20 may be configured to detect the clock signal CLK 126 at $T_1$ and immediately adjust the internal reset signal IRST 84 at $T_2$. In some embodiments, $T_2$ is substantially the same time as $T_1$. In other embodiments, $T_2$ may be a very short time 131 after $T_1$, such as within less than approximately five cycles of the clock detect circuit 82 detecting the clock signal CLK 126. In some embodiments, $T_2$ may be within approximately 20 ns or less of $T_1$. The internal reset signal IRST 84 may be any type of signal, such as a step-shift from a third voltage 132 to a fourth voltage 134 as shown in FIG. 6. The internal reset signal IRST 84 may be configured to reset the display driver 20 at $T_2$ to the ready state 106 configured to receive data signals from the host 12.

At some time while the display driver 20 is in the ready state 106, the host 12 may begin to supply data signals 136 to the display driver 20. Data signals 136 may be processed within the display driver 20 in the active state 110 into image signals to drive the display 18. To shift the display driver 20 from the ready state 106 to the active state 110 to drive the display 18, the display driver 20 is configured to receive a power packet (PWR) 108 at $T_3$, which may be a length of time (e.g., 10-100 μs) after $T_2$. Upon receiving the power packet 108, the display driver 20 may adjust a power enable signal 138 supplied to the PMU 78 to control the PMU 78. The power enable signal 138 may be adjusted at $T_4$ and may include any type of signal, such as a step-shift from a fifth voltage 140 to a sixth voltage 142 as shown in FIG. 6.

In the active state 110, the PMU 78 may be configured to supply a high voltage (HV) signal 144 at $T_5$ to the display driver 20 upon receipt of the power enable signal 138 at $T_4$. $T_5$ may be configured to be substantially the same as $T_4$ or a length of time (e.g., 10-100 μs) after $T_4$. The high voltage signal HV 144 may increase from a base voltage 146 at $T_5$ to an operating voltage 148 at $T_6$. In some embodiments, the data driver 20 may receive data packets 150 from the host 12 before or after receiving the power packet 108. The display driver 20 in the active state 110 may be configured to discard all or part of data packets 150 received prior to $T_6$ so that the display driver 20 may drive the display 18 with the high voltage signal HV 144 at the operating voltage 148. The display driver 20 may begin to drive the display 18 to produce images based on the received data packets 150 at $T_6$ or any time thereafter while the display driver 20 is in the active state 110. The turn-on time 152 of the display 18 may be the time difference between $T_1$ when the host 12 supplies the clock signal CLK 126 and $T_6$ when the display driver 20 drives the display 18 to produce images. As described above with FIGS. 4 and 5, embodiments of the display driver 20 may be configured to reset the display driver 20 upon detection of the clock signal CLK 126 without waiting for a host-issued reset signal that may be issued after a time delay from the clock signal CLK 126. This may reduce the turn-on time 152 of the display 18.

Figure 7:
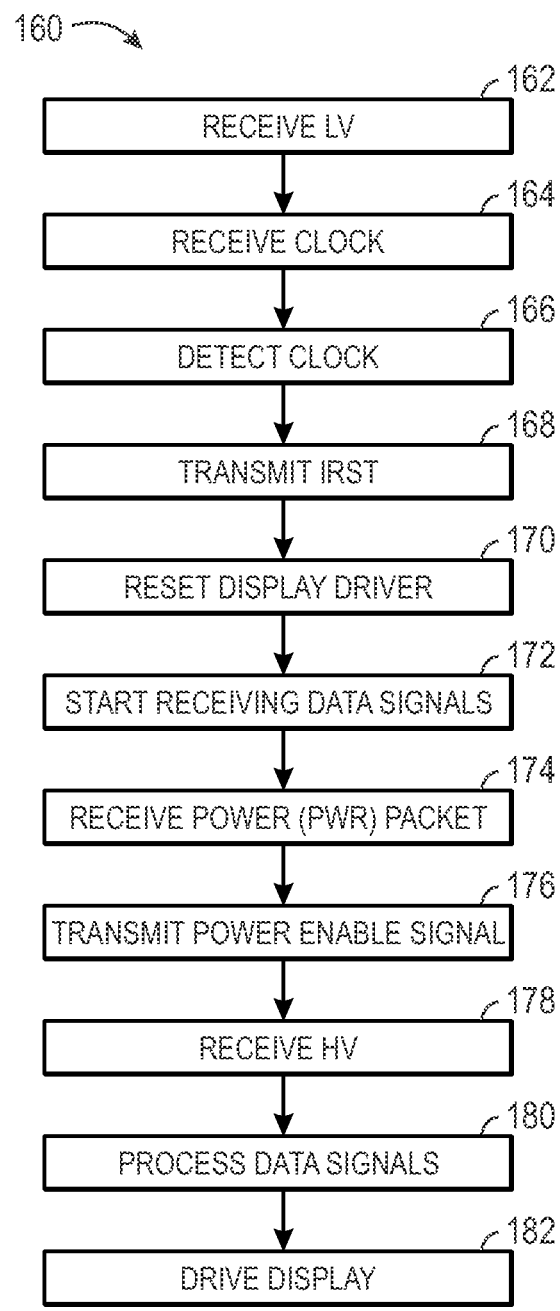
FIG. 7 is a flowchart describing a method of reducing turn-on time of a display by using a display driver with a clock detect circuit, in accordance with an embodiment.

As presented above, the display driver 20 reduces the turn-on time of a display 18 through a series of operations to reset the display driver 20 without waiting for a host-issued (external) reset signal. FIG. 7 illustrates one embodiment of a method 160 for reducing turn-on time of a display 18 by using a display driver 20 with a clock detect circuit 82. At block 162, the display driver 20 receives a low voltage signal. The low voltage signal may be sufficient to operate the digital circuits within the display driver 20, such as the state machine 80, the clock detect circuit 82, and the power enable circuit 86. The display driver 20 may be in an idle state 104 at block 162. Then, at block 164, the display driver 20 receives a clock signal from the host 12. The clock signal may be configured to synchronize the display driver 20 with the host 12 and to facilitate the ordering of operations by the display driver 20. At block 166, the clock detect circuit 82 detects the clock signal as it is received by the state machine 80. Upon detection of the clock signal, the clock detect circuit 82 transmits an internal reset signal IRST 84 to the state machine 80 at block 168. In some embodiments, the display driver 20 is reset only by the internal reset signal IRST 84, and the display driver 20 is not configured to wait for an external reset signal, such as a host-issued reset signal. At block 170, the internal reset signal IRST 84 causes the display driver 20 to reset to a certain state, such as the ready state 106.

In the ready state 106, the display driver 20 receives data signals from the host 12 at block 172. Initially, as shown at block 174, the data signals from the host 12 include a power packet 108 to be used to control the PMU 78. Upon receipt of the power packet 108, the display driver 20 may shift to an active state 110. At block 176, the power packet 108 directs the power enable circuit 86 of the display driver 20 to transmit a power enable signal to the PMU 78 to control a high voltage signal supplied to power the display driver 20. The display driver 20 receives the high voltage signal at block 178. Next, at block 180, the display driver 20 processes received data signals into image signals. The data signals may be received as display packets 150. After processing, the image signals are used to drive the display 18 to produce images at block 182. In this method 160, the display 18 is driven to produce images in the active state 110 (e.g., turned-on) without waiting for or receiving a reset signal from outside the display driver 20.

In some embodiments of the method 160, the display driver 20 may continue to receive data packets 150 as at block 172 after receiving the power packet 108 at block 174. These received data packets 150 may relate to images to be produced on the display 18. The data packets 150 may be discarded or stored for later use to produce images on the display. The display driver 20 may process these received data packets 150 as at block 180 concurrently with transmitting the power enable signal at block 176 and receiving the high voltage signal at block 178 so that the display driver 20 may drive the display 18 to produce images from the received data packets 150 as soon as the received high voltage signal is sufficient to power the display 18.

The embodiments discussed above with FIGS. 4-7 may be configured to internally reset the display driver upon detection of the clock signal CLK without waiting for an externally issued reset signal. The display driver 22 configured to reset upon detection of the clock signal CLK may reduce the turn-on time of the display 18 and reduce the operations performed by the host 12 to operate the display 18. Some embodiments may further reduce the turn-on time of the display 18 and reduce the operations of the host 12 by utilizing the internal reset signal IRST 84 for more than resetting the state machine 80 and display driver 22.

Figure 8:
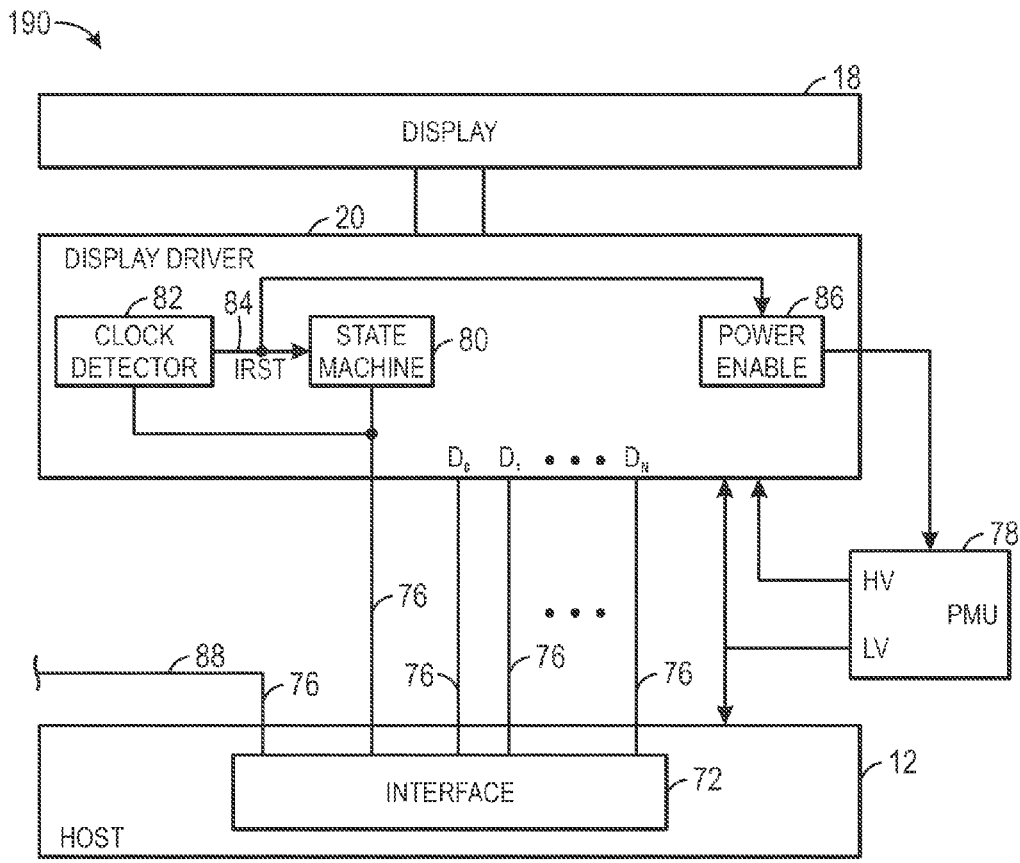
FIG. 8 is a block diagram illustrating a display driver having a clock detect circuit to supply an internal reset signal to reset the display driver and control a power management unit upon detection of a clock signal, in accordance with an embodiment.
Figure 9:
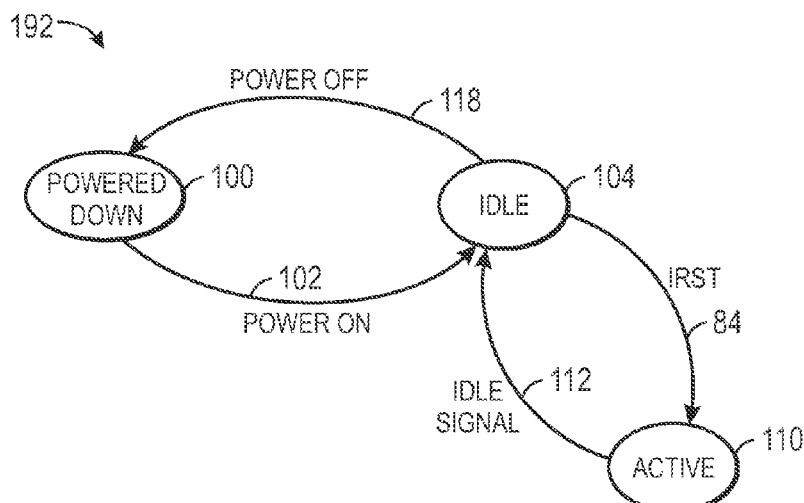
FIG. 9 is a state diagram illustrating operating states of an embodiment of the display driver of FIG. 8.

The embodiment of the second display processing circuit 190 illustrated in FIG. 8 may be structurally similar to the embodiment of the first display processing circuit 70 illustrated in FIG. 4. For example, the host 12 may be configured to supply data signals (e.g., $D_0, D_1 \ldots D_N$) from an interface 72 (e.g., MIPI) to the display driver 20 so that the display driver 20 may drive the display 18 to produce images based on the data signals. The host 12 may be configured to supply a number of signals (e.g., clock signal (CLK, data signals) along a number of connections 74. In some embodiments, the clock signal CLK may be supplied by an interface 72 separate from the data signals. The clock signal CLK may be configured to synchronize the display driver 20 with the host 12 to improve the communication between the host 12 and the display driver 20 through the interface 72. A clock detect circuit 82 within the display driver 20 is configured to detect the clock signal CLK and transmit an internal reset signal IRST 84 to a state machine 80 within the display driver 20.

As described with FIG. 4, a power management unit (PMU) 78 may be coupled to the host 12 and display driver 20 to supply low voltage for processing signals. The low voltage may be sufficient for operating the digital circuits of the host 12 and display driver 20. The PMU 78 may be configured to supply a high voltage HV to power the display driver 20 on demand upon receiving a power enable signal from a power enable circuit 86 within the display driver 20. The high voltage may be used by the display driver 20 to provide power for the image signals used to drive the display 18 to produce images.

In the previously described embodiment of FIG. 4, the power enable circuit 86 is configured to supply the power enable signal upon receiving a power packet from the host 12. In the presently disclosed embodiment illustrated in FIG. 8, the power enable circuit 86 is configured to supply the power enable signal to the PMU 78 upon receipt of the internal reset signal IRST 84. The power enable circuit 86 may be coupled to the state machine 80 and/or the clock detect circuit 82 to receive the internal reset signal IRST 84. In this way, the PMU 78 may be configured to supply a high voltage upon detection of the clock signal CLK without waiting for a host-issued data signal (e.g., power packet).

The second display processing circuit 190 may reduce the turn-on time of the display 18 and reduce the operations of the host 12 to operate the display 18. For example, the second display processing circuit 190 may reduce the turn-on time by reducing the connections 76 between the host 12 and the display driver 20 and reducing the number of signals transmitted between the host 12 and the display driver 20 prior to producing an image on the display 18. The display driver 20 may be configured to change from the idle state to the ready state upon receiving the clock signal from the host 12 without receiving a host-issued reset signal or issuing a display driver acknowledgement signal to the host 12. This reduces the operations of the host before the display driver 20 processes data signals. Eliminating the host-issued reset signal may enable a designated reset connection 88 (e.g., I/O pin) to be configured for another use by the host 12 or eliminated.

Additionally, using the internal reset signal IRST 84 to control the PMU 78 to supply a high voltage upon detection of the clock signal CLK without waiting for a host-issued data packet may further reduce the turn-on time of the display 18. The power enable circuit 86 may be configured to receive the internal reset signal IRST 84 and to transmit the power enable signal to the PMU 78 without waiting for a power packet or other data signals from the host 12. Using the internal reset signal IRST 84 to transmit the power enable signal may reduce the turn-on time by any delay that may be placed between the host 12 supplying the clock signal CLK and supplying the power packet. The power enable circuit 86 may be configured to supply the power enable signal within the cycle detected by the clock detect circuit 82 or within the next cycle of the clock signal CLK. In some embodiments, the internal reset signal IRST 84 may be received by the power enable circuit 86 within approximately five clock cycles (e.g., 20 ns) of the clock signal CLK being received by the clock detect circuit 82. The power enable circuit 86 may be configured to supply the power enable signal within than approximately twenty cycles, ten cycles, or five cycles of receiving the internal reset signal IRST 84.

By using the internal reset signal IRST 84 to reset the display driver 20 and to transmit the power enable signal to the PMU 78, the second display processing circuit 190 may shift directly from an idle state to the active state configured to process data signals into image signals to produce images on the display 18. The second state diagram 192 of FIG. 9 generally illustrates some of the operating states of the display driver 20 of the second display processing circuit 190. The second state diagram 192 may be substantially similar to the first state diagram 98, except that the display driver 20 of the second display processing circuit 190 may be configured to shift directly from the idle state 106 to the active state 110. Upon detecting the clock signal in the idle state 104, the clock detect circuit 82 is configured to use the internal reset signal IRST 84 to reset the display driver 20 and transmit the power enable signal to the PMU 78. Whereas the display driver 20 of the first display processor circuit 70 is reset to the ready state 106 configured to receive the power packet and transmit the power enable signal, the display driver 20 of the second display processor circuit 190 is reset to the active state 110 configured to process the supplied data packets into image signals to drive the display 18 because the power enable signal is transmitted to the PMU 78 upon detection of the clock signal. In this way, the display driver 20 may be configured to receive and process the data packets into image signals to drive the display 18 receiving only the clock signal and data packets from the host 12.

Using the internal reset signal IRST 84 to transmit the power enable signal to the PMU 78 may reduce the operations of the host 12, which may enable the host 12 to perform other operations faster, to operate at lower temperatures, or to improve operations of other components coupled to the host 12, or combinations thereof. In some embodiments, the host 12 of the second display processing circuit 190 may be configured to eliminate or reconfigure one or more connections 76 used to supply a power packet to the display driver 20. Furthermore, using the internal reset signal IRST 84 to transmit the power enable signal to the PMU 78 increases the independence of the host 12 from the display driver 20. For example, the host 12 may supply the clock signal CLK and the data packets to the display driver 20 without regard to the operating state of the display driver 20. In some embodiments, the host 12 may supply data packets to the display driver 20 prior to supplying the clock signal CLK. The display driver 20 may be configured to store or discard data packets received when the display driver 20 is not in the active state 110. In this way, the host 12 may be configured to supply signals (e.g., clock signal CLK, data signals) to the display driver 20 without receiving any signals from the display driver 20. The host 12 may be an "agnostic host" in that it does not receive signals from the display driver 20.

Figure 10:
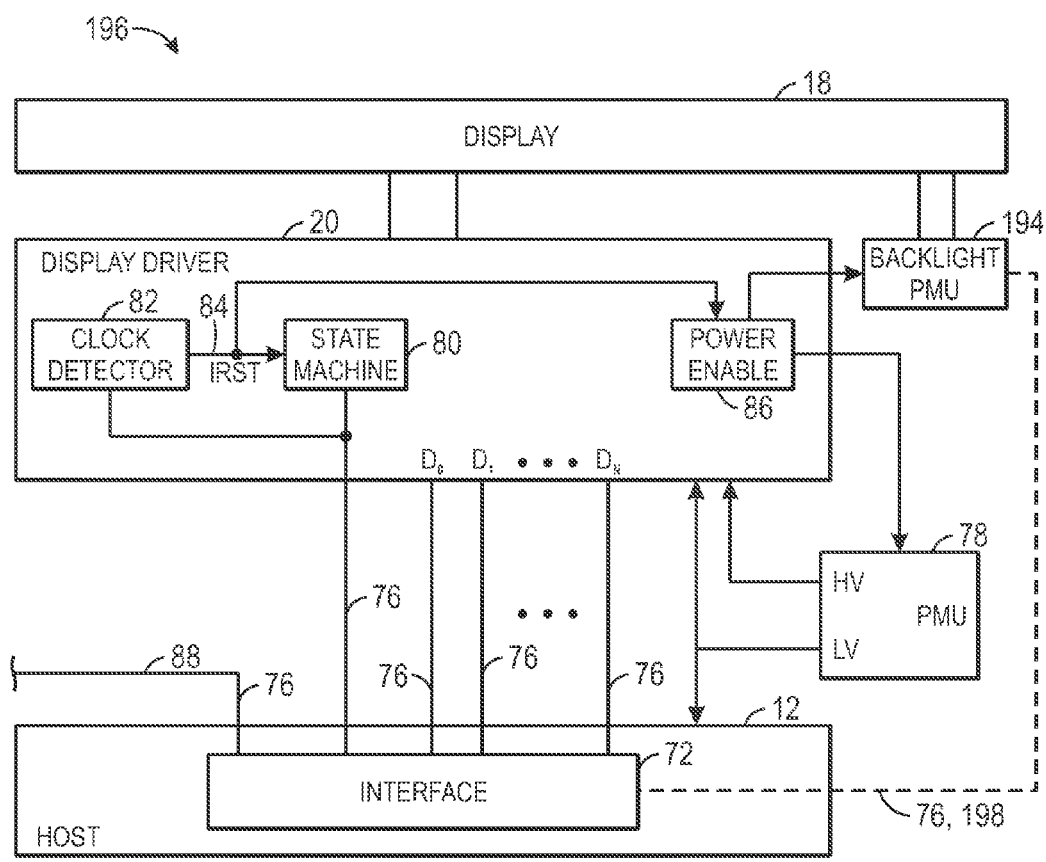
FIG. 10 is a block diagram illustrating a display driver having a clock detector circuit to supply an internal reset signal to reset the display driver, control a power management unit, and control a backlight power management unit upon detection of a clock signal, in accordance with an embodiment.

Furthermore, some embodiments may further reduce the turn-on time of the display 18 and reduce the operations of the host 12 by utilizing the internal reset signal IRST 84 to transmit a power enable signal to the PMU 78 and a backlight power management unit (BPMU) 194 as shown in the third display processing circuit 196 illustrated in FIG. 10. The embodiment of the third display processing circuit 196 of FIG. 10 may be structurally similar to the embodiment of the second display processing circuit 190 illustrated in FIG. 8, with the addition that the power enable circuit 86 may be configured to transmit the power enable signal to both the PMU 78 and the BPMU 194 upon receipt of the internal reset signal IRST 84. The BPMU 194 is configured to supply power for a backlight of the display 18 to improve the display quality. In the third display processing circuit 196, the BPMU 194 may be configured to receive the power enable signal from the power enable circuit 86 rather than a backlight PMU connection 198 with the host 12. This may enable the backlight PMU connection 198 to be eliminated or reconfigured for another use by the host 12. Reconfiguring a connection 76 for another use may increase the processing speed of the host 12 or enable the host 12 to be connected to another component of the electronic device. Eliminating a connection 76 from the host 12 may reduce the host size, weight, cost, or complexity, or combinations thereof.

Figure 11:
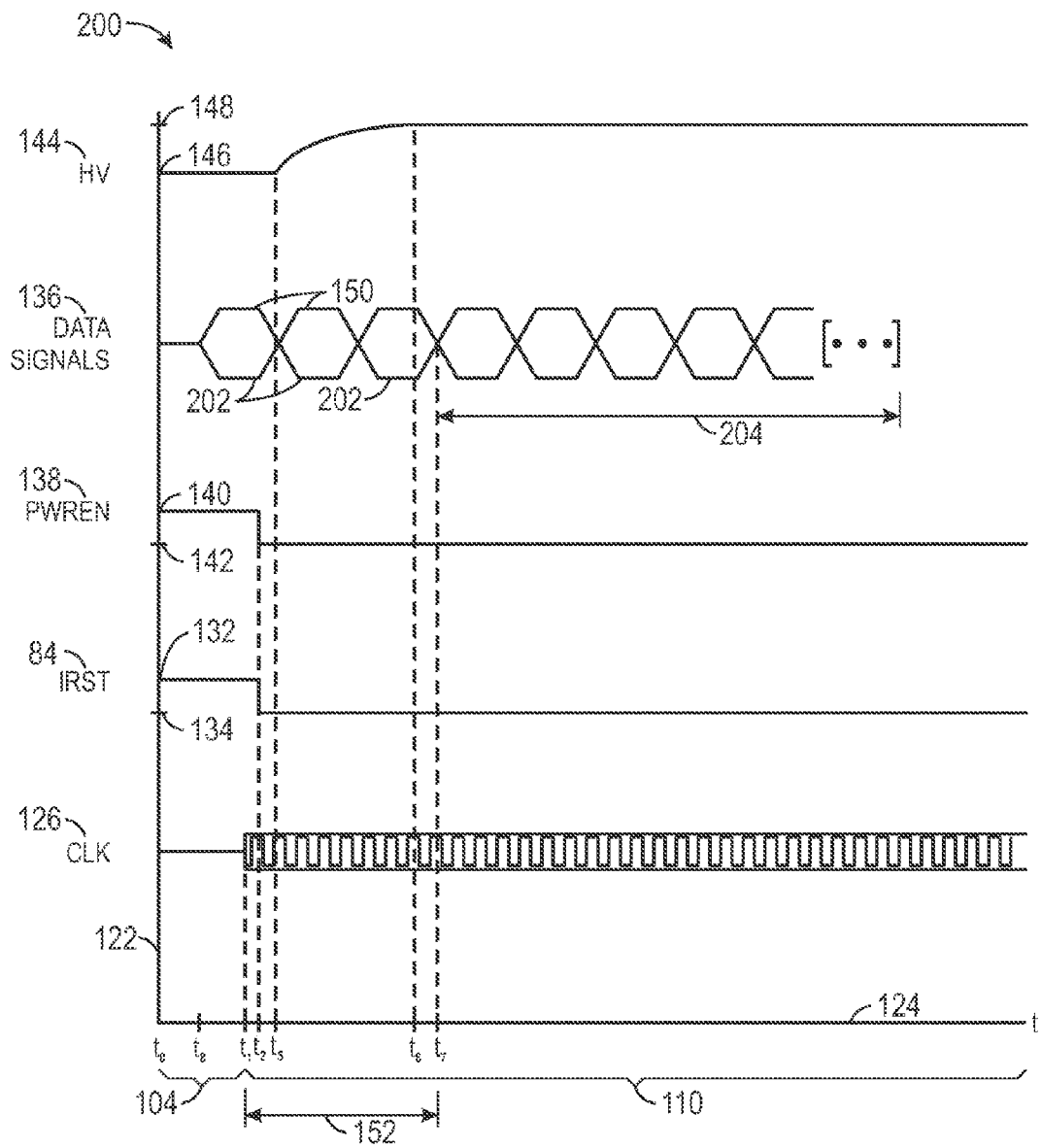
FIG. 11 is a timing diagram illustrating the timing of signals received and transmitted by a display driver when a display is turned on, in accordance with an embodiment.

To facilitate the understanding of the display driver 20 of the second and third display processing circuits 190, 196 that utilize the internal reset signal IRST 84 for more than resetting the display driver 20, the graph 200 of FIG. 11 illustrates an embodiment of the relative timing of the various signals discussed above. Like the graph 120 of FIG. 6, the Y-axis 122 includes a series of signals that may be supplied or received by the display driver 20 during operation, and the X-axis 124 represents the time of operation of the electronic device 10. At $T_0$, the display driver 20 is in the idle state 104 awaiting the receipt of the clock signal CLK 126. At $T_0$, the display 18 is not being driven by the display driver 20. At $T_1$, the host 12 supplies the clock signal CLK 126 to the display driver 20. The clock detect circuit 82 within the display driver 20 may be configured to detect the clock signal CLK 126 at $T_1$ and immediately adjust the internal reset signal IRST 84 at $T_2$. In some embodiments, $T_2$ is the same time as $T_1$. In other embodiments, $T_2$ may be a very short time 131 after $T_1$, such as within less than approximately five cycles of the clock detect circuit 82 detecting the clock signal CLK 126. In some embodiments, $T_2$ may be within approximately 20 ns of $T_1$. The internal reset signal IRST 84 may be any type of signal, such as a step-shift from a third voltage 132 to a fourth voltage 134 as shown in FIG. 11. The internal reset signal IRST 84 also controls the power enable circuit 86 to adjust the power enable signal 138 at $T_2$ without waiting for a power packet from the host 12. The power enable signal 138 may be supplied to at least one of the PMU 78 and the BPMU 194. The power enable signal 138 may be any type of signal, such as a step-shift from a fifth voltage 140 to a sixth voltage 142. The internal reset signal IRST 84 resets the display driver 20 directly to the active state 110 without first shifting to a ready state because the power enable signal 138 is adjusted upon detection of the internal reset signal IRST 84.

Upon receiving the adjusted power enable signal 138 at $T_2$, the PMU 78 is configured to begin supplying the high voltage (HV) signal 144 at $T_5$ to power the display driver 20. $T_5$ may be substantially the same as $T_2$ or a length of time (e.g., 10-100 μs) after $T_2$. The high voltage signal HV 144 may increase from a base voltage 146 at $T_5$ to an operating voltage 148 at $T_6$. In some embodiments, the data driver 20 may receive data packets 150 from the host 12 before or after receiving the clock signal CLK 126. The display driver 20 in the active state 110 may be configured to store or discard all or part of data packets 150 received prior to $T_6$ so that the display driver 20 may drive the display 18 with the high voltage signal HV 144 at the stable operating voltage 148 to maintain display quality. For example, the host 12 may begin to supply data packets 150 to the display driver 20 at $T_8$ before and while supplying the clock signal CLK 126. The display driver 20 may be configured to discard the data packets 150 received prior to receiving the high voltage signal HV 144 at the operating voltage 148 at $T_6$. In some embodiments, the display driver 20 may begin to drive the display 18 to produce images based on the received data packets 150 at $T_6$ or any time thereafter, such as $T_7$, while the display driver 20 is in the active state 110. In some embodiments, the display driver 20 may wait from $T_5$ to $T_6$ to display images based on the received data packets 150 so that the display may be driven at the stable operating voltage 148. As illustrated in FIG. 11, an embodiment of the display driver 20 may discard some (e.g., three data packets 202 received before $T_6$ and drive the display 18 at $T_7$ to display images based on the subsequent data packets 204 received after $T_6$.

The turn-on time 152 of the display 18 may be the time difference between $T_1$ when the host 12 supplies the clock signal CLK 126 and $T_7$ when the display driver 20 drives the display 18 to produce images. As described above with FIGS. 8-10, some embodiments of the display driver 20 may be configured to use the internal reset signal IRST 84 to reset the display driver 20 upon detection of the clock signal CLK 126 and to adjust the power enable signal 138 without waiting for other host-issued signals such as external reset signals or power packets. In some embodiments, the display driver 20 may be configured to receive only the clock signal CLK 126 and data packets 150 without receiving other signals from the host 12. This may eliminate time delays of the host 12 between sending the clock signal CLK 126 and data packets 150 and reduce the turn-on time 152 of the display 18.

Figure 12:
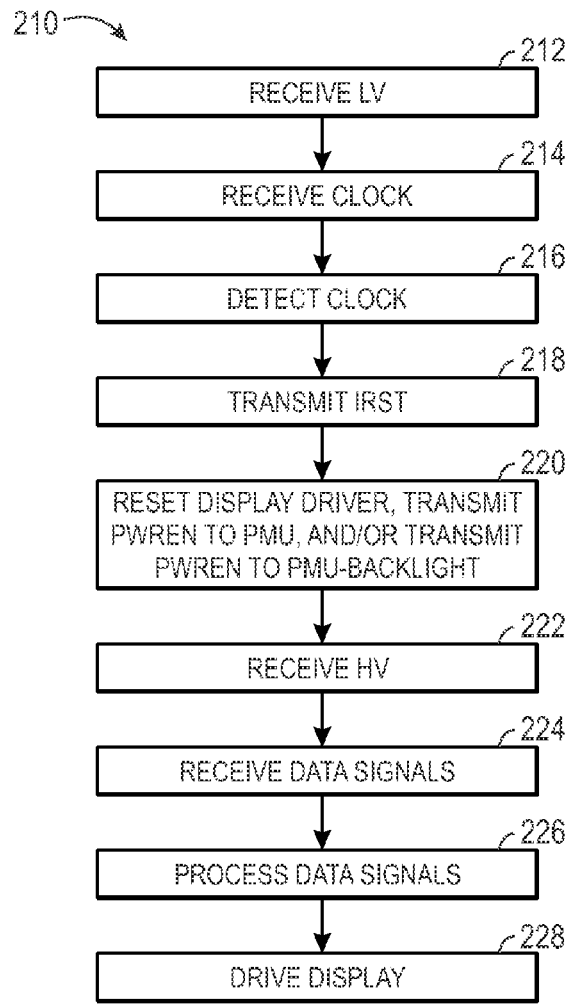
FIG. 12 is a flowchart describing a method of using an internal reset signal supplied upon detection of a clock signal for one or more purposes, in accordance with an embodiment.
Figure 13:
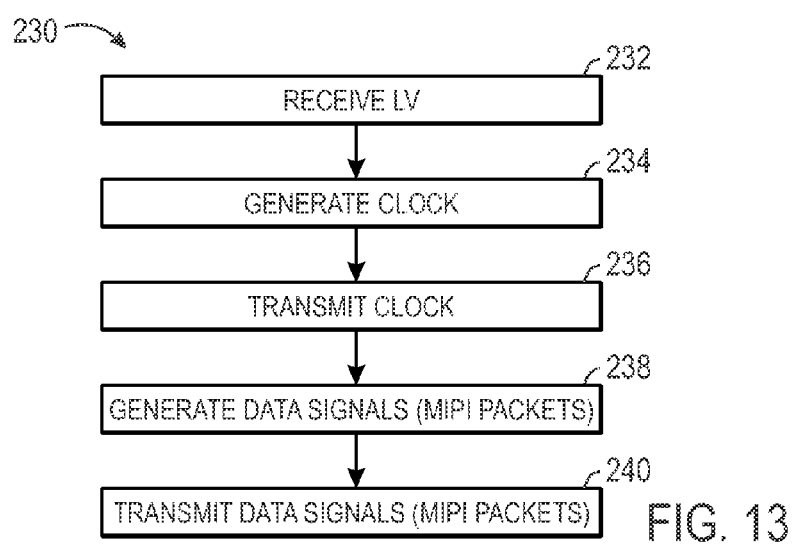
FIG. 13 is a flowchart describing a method of reducing the turn-on time of an electronic display by reducing the operations of a host, in accordance with an embodiment.

As presented above, the display driver 20 reduces the turn-on time of a display 18 through a series of operations to reset the display driver 20 and adjust the power enable signal without waiting for a host-issued (external) signal. FIG. 12 illustrates one embodiment of a method 210 for reducing turn-on time of a display 18 by using a display driver 20 with a clock detect circuit 82 as shown in the second and third display processing circuits 190, 196. At block 212, the display driver 20 receives a low voltage signal. The low voltage signal is sufficient to operate the digital circuits within the display driver 20, such as the state machine 80, the clock detect circuit 82, and the power enable circuit 86. The display driver 20 may be in an idle state 104 at block 212. At block 214, the display driver 20 receives a clock signal from the host 12. The clock signal may be configured to synchronize the display driver 20 with the host 12 and to facilitate the ordering of processing operations by the display driver 20. At block 216, the clock detect circuit 82 detects the clock signal as it is received by the state machine 80. Upon detection of the clock signal, the clock detect circuit 82 transmits the internal reset signal IRST 84 to the state machine 80 at block 218. In some embodiments, the display driver 20 is reset only by the internal reset signal IRST 84, and the display driver 20 is not configured to wait for an external reset signal, such as a host-issued reset signal. The internal reset signal IRST 84 is also transmitted to the power enable circuit 86, and the power enable circuit 86 is not configured to wait for an external power packet or other data signal.

At block 220, the internal reset signal IRST 84 causes the display driver 20 to reset to a state, such as the active state 110. The internal reset signal IRST 84 also controls the power enable circuit 86 to transmit the power enable signal. In some embodiments, the power enable signal may be supplied only to the PMU 78 to control the PMU 78 to supply the display driver 20 with a high voltage signal. In some embodiments, the power enable signal may be supplied only to the BPMU 194 to control the BPMU 194 to power a backlight of the display 18. Moreover, in some embodiments, the power enable signal may be supplied to both the PMU 78 and the BPMU 194. In this way, the internal reset signal IRST 84 may be used by the display driver 20 for multiple purposes at block 220.

After using the internal reset signal IRST 84 for one or more purposes, the display driver 20 receives the high voltage signal at block 222. The display driver 20 receives data signals from the host 12 at block 224. In some embodiments the host 12 may supply the data signals (e.g., data packets) at any time, such as prior to block 222, block 218, or block 214. The display driver 20 may be configured to receive the data packets and discard or store data packets received prior to when the display driver 20 receives the high voltage signal at block 222. The display driver 20 processes the received data packets into image signals at block 226. After processing, the image signals are used to drive the display 18 to produce images at block 228 as soon as the high voltage signal is sufficient, that is the high voltage signal is stable and capable of powering the display 18. In this method 210, the display 18 may be driven to produce images in the active state 110 (e.g., turned-on) without waiting for or receiving either a reset signal or power packet from outside the display driver 20.

The methods described above with FIGS. 7 and 12 describe embodiments of the series of operations the display driver 20 of the first, second, and third display processing circuits 70, 190, 196. Some of the embodiments may reduce the turn-on time of the display 18 and reduce the number of operations performed by the host 12 to control the display driver 20. The method 230 illustrates an embodiment for operating the host 12. At block 232, the host 12 receives the low voltage signal. The low voltage signal may be from the PMU 78 and may be used to power the digital circuits of the host 12. At block 234, the host 12 generates a clock signal. The clock signal may be used to order and synchronize the operations of the host 12. Upon generating the clock signal, the host 12 transmits the clock signal to the display driver 20 at block 236. In some embodiments, the host 12 may transmit the clock signal to other components within the electronic device 10 to synchronize the other components with the host 12. At block 238, the host 12 generates data signals (e.g., data packets) to supply to the display driver 20. In some embodiments where the interface 72 is a MIPI, the data packets may be generated as MIPI packets. At block 240, the host 12 transmits the data signals (e.g., MIPI packets) to the display driver 20. In some embodiments, the display driver 20 may be configured to process the MIPI packets to drive the display 18 to produce images. The method 230 illustrates some of the operations performed by the host 12 to control the display driver 20 without supplying a host-issued reset signal or power packet. In some embodiments, the host 12 may be an "agnostic host" in that it is not configured to receive return signals from the display driver 20. The method 230 is not intended to limit the host 12 from communicating with other components of the electronic device 10 and performing additional operations not described herein. In some embodiments, the host 12 may perform additional operations, such as supply a host-issued reset signal or a host-issued power packet.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system comprising:
   a host configured to transmit a plurality of signals, wherein the plurality of signals comprises a clock signal and data signals; and
   a display driver coupled to the host, wherein the display driver is configured to drive a display based at least in part on the data signals, wherein the display driver is configured to be reset upon detection of the clock signal without waiting for a host-issued reset signal.

2. The system of claim 1, wherein the display driver comprises:
   a state machine configured to receive the clock signal from the host; and
   a clock detect circuit configured to detect the clock signal and transmit an internal reset signal to the state machine to reset the display driver without a dedicated host-issued reset signal.

3. The system of claim 2, wherein the clock detect circuit is configured to transmit the internal reset signal immediately upon detection of the clock signal.

4. The system of claim 1, wherein the display driver comprises a power enable circuit configured to control a power management unit (PMU), wherein the PMU is configured to power the display driver.

5. The system of claim 4, wherein the plurality of signals comprises a power signal and the power enable circuit is configured to control the PMU based at least in part on the power signal.

6. The system of claim 1, wherein the host is configured to transmit data signals to the display driver without regard to an operating state of the display driver.

7. An electronic display comprising:
a display panel; and
a display driver configured to drive the display panel, wherein the display driver comprises:
a state machine configured to receive a clock signal from a host; and
a clock detect circuit configured to detect the clock signal and transmit an internal reset signal to the state machine to reset the display driver without a dedicated host-issued reset signal.

8. The electronic display of claim 7, wherein the display driver is configured to receive data signals and to drive the display panel based at least in part on the data signals.

9. The electronic display of claim 7, comprising a power management unit (PMU) configured to power the display driver based at least in part on the internal reset signal.

10. The electronic display of claim 7, comprising:
a backlight; and
a backlight-power management unit configured to power the backlight based at least in part on the internal reset signal.

11. A method for operating a display driver to drive a display comprising:
detecting a clock signal received by the display driver;
resetting the display driver upon detection of the clock signal without waiting for an external reset signal;
receiving data signals; and
driving the display based at least in part on the data signals.

12. The method of claim 11, comprising generating an internal reset signal within the display driver based at least in part on detecting the clock signal, wherein the internal reset signal is configured to reset the display driver without waiting for an external reset signal.

13. The method of claim 11, comprising transmitting a power enable signal to a power management unit (PMU), wherein the PMU is configured to power the display driver upon receipt of the power enable signal.

14. The method of claim 13, comprising receiving a power packet, wherein transmitting the power enable signal is based at least in part on the power packet.

15. An article of manufacture comprising:
one or more non-transitory, machine-readable media, at least collectively comprising instructions configured to be executed by a host processor, the instructions comprising instructions to:
transmit a clock signal to display driver circuitry from the host processor; and
transmit data signals to the display driver circuitry from the host processor without transmitting one or more separate control signals to control an operating state of the display driver circuitry.

16. The article of manufacture of claim 15, wherein the instructions are to be executed in order such that the host processor does not transmit any intervening signals to the display driver circuitry between the clock signal and the data signals.

17. A system comprising:
a host configured to transmit a plurality of signals, wherein the plurality of signals comprises a clock signal and data signals;
a display driver coupled to the host, wherein the display driver is configured to be reset upon detection of the clock signal without waiting for a host-issued reset signal, and the display driver is configured to drive a display based at least in part on the data signals; and
a processor management unit (PMU) coupled to the display driver, wherein the PMU is configured to power the display driver upon detection of the clock signal without waiting for a host-issued power packet.

18. The system of claim 17, wherein the display driver comprises a clock detect circuit configured to detect the clock signal and transmit an internal reset signal configured to reset the display driver.

19. The system of claim 18, wherein the PMU is configured to power the display driver based at least in part on the internal reset signal.

20. The system of claim 19, comprising a backlight power management unit configured to power a backlight of the display based at least in part on the internal reset signal.

21. An electronic display comprising:
a display driver comprising an interface, wherein the interface is configured to receive a plurality of signals consisting of:
a clock signal, wherein the display driver is configured to reset the display driver based at least in part on the clock signal without receiving another control signal; and
data signals, wherein the display driver is configured to drive the electronic display based at least in part on the data signals.

* * * * *